United States Patent [19]

Dressler

[11] 4,356,480
[45] Oct. 26, 1982

[54] LIQUID LEVEL SENSING CIRCUITRY
[75] Inventor: Daryl D. Dressler, St. Paul, Minn.
[73] Assignee: Minnesota Mining and Manufacturing Company, St. Paul, Minn.
[21] Appl. No.: 186,213
[22] Filed: Sep. 11, 1980
[51] Int. Cl.³ .............................................. G08B 21/00
[52] U.S. Cl. ...................................... 340/620; 340/59
[58] Field of Search ............... 340/620, 59; 73/304 R, 73/304 C; 235/92 FL

[56] References Cited
U.S. PATENT DOCUMENTS
3,978,464  8/1976  Miesterfeld ........................ 340/59 X Primary Examiner—John W. Caldwell, Sr.
Assistant Examiner—Daniel Myer
Attorney, Agent, or Firm—Cruzan Alexander; Donald M. Sell; Robert L. Marben

[57] ABSTRACT

Liquid level sensing circuitry provides storage of a signal upon operation of a switch. The signal stored is dependent on whether a probe is in contact with the liquid sensed. Provision is made to prevent storage of a different signal for a period of time should the switch be operated more than once during such period of time. A different discernible indication is produced for each stored signal.

17 Claims, 4 Drawing Figures

LIQUID LEVEL SENSING CIRCUITRY

BACKGROUND OF THE INVENTION

This invention relates to liquid level sensing circuitry in particular to such circuitry for the electronic detection of engine crankcase oil level to determine whether it is at an acceptable or unacceptable level.

Monitoring of the crankcase oil level for essentially all automobilles and engine driven heavy equipment presently in use is carried out by the visual inspection of the oil level as indicated on a dip stick that must be manually withdrawn from an engine. Heretofore, gasoline station attendants carried out this messy procedure for automobiles as a service to customers, but the extent to which that service is available has dwindled due to the establishment of self-service gasoline stations. The burden of carrying out this messy task is left to the automobile operator who is generally reluctant to carry out the task because of its very messy nature. Many times the task is deferred until it can be done without soiling clothing and/or hands or until someone else can do it. This, of course, leads to long periods between oil level checks which in turn results in otherwise avoidable damage to the engine due to operation of the engine with a low crankcase oil level. While many automobiles have an oil pressure indicator that presents an indication when there is an oil pressure problem, the appearance of such an indication due to a low oil level is usually untimely in that the engine has already been operating at too low a level for a long period of time.

SUMMARY OF THE INVENTION

The foregoing oil level monitoring problem is solved by the present invention which is also applicable to the monitoring of the level of other liquids. The invention is embodied in circuitry which in a preferred form includes a first means for providing a first signal when the liquid level sensed is in contact with a conductive probe and a second signal when the liquid level is not in contact with the probe. A second means, which includes a switch, is provided for storing the first and second signals when the switch is operated from a first position to a second position. The circuitry also provides a third means which responds to the storing of the second signal by the second means to provide a discernible indication which remains until the switch is returned to its first position. The third means can also provide a discernible indication in response to the storing of the first signal.

The second means providing for the storing of the first and second signals upon operation of the switch to its second position includes a clocking circuit which is operatively connected to the switch. The clocking circuit functions to provide a clocking signal in response to the switch being placed in its second position with a latch circuit portion also provided for storing the first and second signals in response to the clocking signal.

In the case of an automobile engine, it is preferable to effect the operation of the switch used in the circuitry by coupling such action with the operation of the engine ignition key when starting the engine. In such an application, the clocking circuit portion includes means for providing a delayed resetting of the clocking circuit. With such a delay provided, the circuitry can not store a different one of the first and second signals which may be present due to repeated efforts made to start the engine during the delay period provided.

The delayed resetting of the clocking circuit is also useable for providing the timing for the discernible indication that is initiated in response to the storing of the first signal, such indication being terminated in response to the resetting of the clocking circuit portion.

The second means may be of a form wherein one indicating device is operative to provide the discernible indication when the liquid level sensed is in contact with the probe with a second indicating device provided which is operative to produce the discernible indication when the liquid level sensed is below the probe. The use of two indicating devices is preferred, particularly if it is a visible indication that is produced, allowing the use of separate colors and, if desired, steady or flashing operation to provide the operator with the desired information regarding the detected liquid level. An embodiment is also disclosed wherein a single indicating device provides a steady discernible indication when the liquid level sensed is in contact with the probe with a varying discernible indication provided when the liquid level sensed is not in contact with the probe.

BRIEF DESCRIPTION OF THE DRAWINGS

The novel features and advantages of the present invention will become more apparent to those skilled in the art upon consideration of the following detailed description which refers to the accompanying drawing wherein.

DETAILED DESCRIPTION

Figure 1:
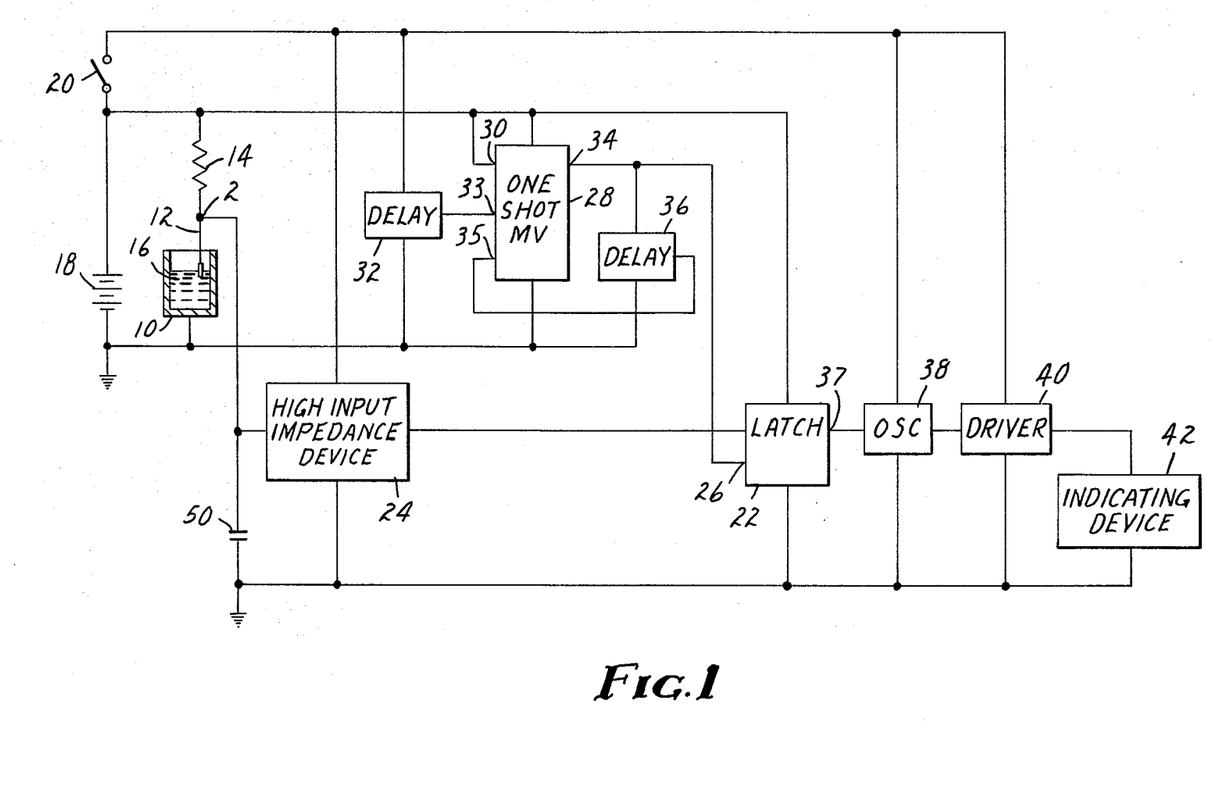
FIG. 1 is a block diagram of circuitry of the invention wherein a single indicating device provides a discernible indication in response to a liquid level sensed that is not in contact with the sensing probe.

Referring to FIG. 1 of the drawings a liquid level sensing circuit embodying the invention is shown. A first circuit portion is provided by the circuitry of FIG. 1 which provides a first signal when the liquid 16 in a container 10 makes contact with a conductive probe 12 with a second signal provided when the liquid is not in contact with the probe 12. The first circuit portion of FIG. 1 includes a resistor 14 connected in series with the conductive probe 12. The liquid 16 is connected to circuit ground. In FIG. 1, this is accomplished via the ground connection made to a conductive container 10 for the liquid 16. The series circuit including resistor 14 and probe 12, the liquid 16 and container 10 are connected directly across a D.C. source 18, shown as a battery with the resistor 14 connected to the positive side of the source 18. The first and second signals appear at the common connection 2 for the resistor 14 and probe 12. The value of the resistor 14 is selected to be very much larger than the impedance presented by the probe 12 and the liquid 16. This being the case, the first signal, which is presented when the probe is in contact with the liquid 16, is about equal to zero since the probe is then essentially connected to the ground in comparison to the impedance presented by the resistance 14. The second signal, which is presented when the liquid 16 is not in contact with the probe 12, is equal to about the value of the D.C. voltage 18.

In the case where the circuitry is used to sense the oil level for an automobile engine, the value of the resistor 14 is on the order of $10^{10}$–$10^{11}$ ohms. In addition, the container 10 is the oil pan for the vehicle and the probe 12 is provided by a conductor positioned in the opening provided for the oil dip stick for the engine. It is necessary, of course, that the probe 12 be insulated from the engine. When using the circuit to monitor the level of the engine oil, the D.C. voltage supply 18 can be provided by the engine battery. In addition, the circuitry including the resistor 14 and probe 12 can be connected at all times to the battery 18 since it will draw a very small level of current. The probe 12 extends into the crankcase area of the engine so it is out of contact with the engine oil when it is at the minimum acceptable level.

The circuitry of FIG. 1 includes a second circuit portion, which has a switch 20 for controlling the storage of the first and second signals by the second circuit portion. The second circuit portion includes a latch circuit 22 which receives the first and second signals from the first circuit portion via a high impedance device 24 when the device 24 is energized by movement of switch 20 from its first or open position to its second or closed position. The latch circuit 22 stores the signal received from the high impedance device 24 when a clock signal is received at the clock input 26 of the latch circuit. A clock circuit portion is included in the second circuit portion to provide the latch circuit 22 with a clock signal which is supplied within a small fraction of a second after switch 20 has been operated to its closed position. One suitable arrangement for the clock signal portion includes a one-shot multivibrator 28 connected for receiving the D.C. voltage 18 at an input 30 with a delay circuit 32 connected to the D.C. voltage 18 via the switch 20 for supplying a clocking signal to the clock input 33 of the multivibrator 28. Upon closure of the switch 20, the multivibrator is clocked by the signal provided from the delay circuit 32 to provide an output at the output 34 of the multivibrator. The output 34 is connected to the clock input 26 of the latch circuit 22 and supplies the clock signal to the latch circuit 22 when an output is produced at the output 34 of the multivibrator in response to a clock from the delay circuit 32.

In some applications for the liquid level sensing circuit, it is necessary that the second circuit portion provide for the delayed resetting of the multivibrator 28 for a suitable time to prevent another clock signal from being produced by a subsequent operation of the switch 20 and thus prevent entry of another reading from the signal point 2 of the first circuit portion for such time. It is particularly desirable that such delayed resetting be provided when the liquid level circuit is used for the detection of the oil level for an automobile engine and the operation of the switch 20 occurs in response to the operation of the ignition switch for the engine. The oil level presented to the probe 12 at the time switch 20 is first operated is the level for which an indication is desired. The level could be high enough to contact the probe at the time switch 20 is initially operated to provide the first signal to the latch circuit 22, but if the engine fails to continue operation in response to the initial operation of the ignition switch, any operation of the engine that is initiated could cause the oil level to drop out of contact with the probe 12 providing the second signal to the high input impedance device 24 and therefore a different signal to the latch circuit. In the case of FIG. 1, the output 34 from the one-shot multivibrator 28 is applied via a delay circuit 36 to provide a delayed reset signal to the reset terminal 35 of the multivibrator.

The liquid level circuit of FIG. 1 also includes a third circuit portion which is connected to the latch circuit 22 of the second circuit portion and includes circuitry responsive to the output 37 of the latch circuit 22 for providing a discernible indication when the latch circuit 22 has stored a signal in response to the second circuit portion receiving the second signal from the first signal portion. The third circuit portion is arranged so that the discernible indication continues until such time as the switch 20 is operated to its first or open position which is effective to terminate the application of electrical power to the third circuit portion from the D.C. voltage source 18. The third circuit portion for providing such a discernible indication can take on the form of an oscillator 38 which is operative when the latch circuit 22 is providing an output corresponding to a second signal from the first circuit portion and which is inoperative when the latch circuit 22 provides an output corresponding to the first signal presented at the signal point 2 of the first circuit portion. The oscillator 38 is connected to a driver circuit 40 which in turn is connected to an indicating device 42 which, when energized, actually provides the discernible indication. The driver circuit 40 operates under the control of the oscillator 38 causing the indicating device 42 to be turned on and off in accordance with the frequency of operation of the oscillator 38. The indicating device 42 can, for example, be a light source which is turned on and off at the frequency provided by the oscillator 38 or can be a sound producing device which is also turned on and off at the frequency provided by the oscillator 38. It is also possible to use a light producing device plus a sound producing device so the discernible indication is one of light plus sound.

Figure 2:
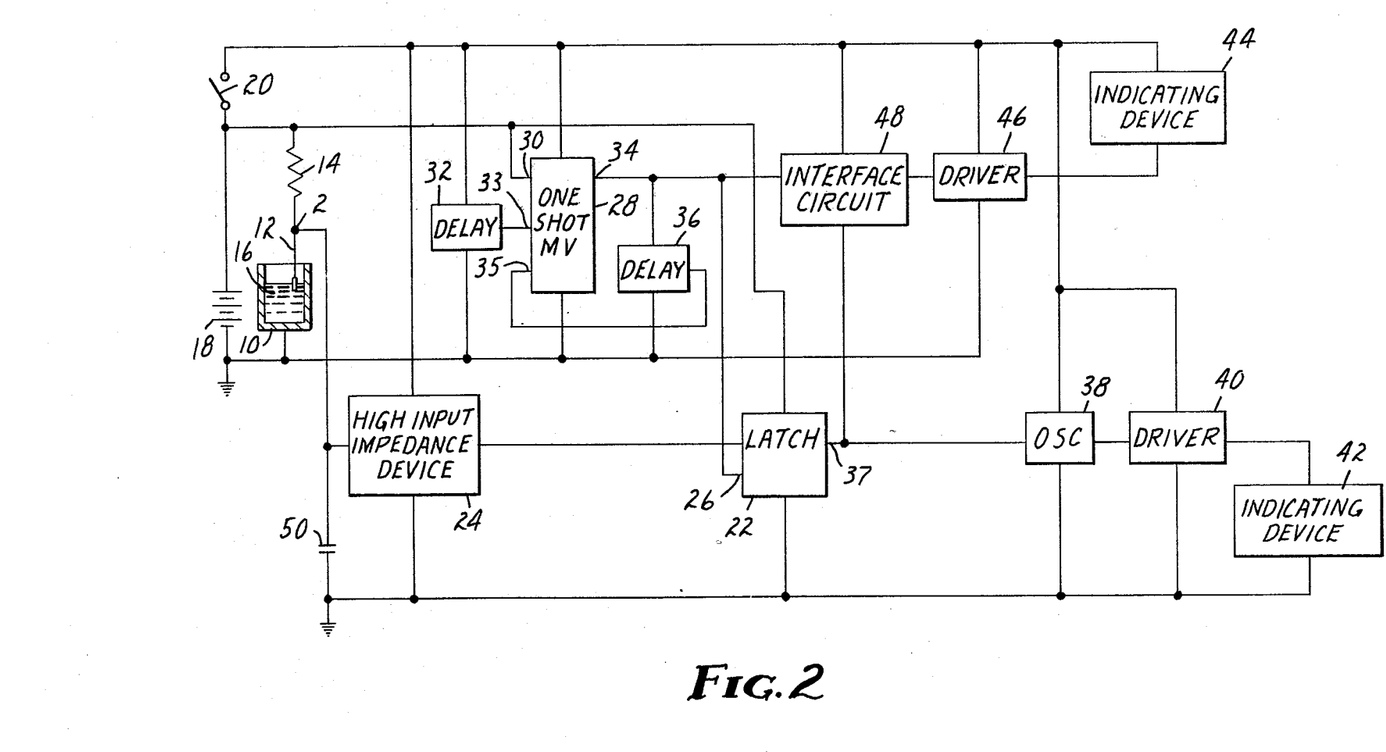
FIG. 2 is a block diagram of circuitry in accordance with FIG. 1 with circuitry added to provide a second indicating device for providing a discernible indication when the liquid level sensed is in contact with the sensing probe.

The circuit of FIG. 1 does not provide a discernible indication when the signal stored by the latch 22 of the second circuit portion is a signal due to the liquid 16 being at a level to contact the probe 12. While a discernible indication may not be needed when the liquid is in contact with the probe 12, it is desirable to have a discernible signal for such condition since it does provide the operator with a positive indication that the liquid level contacts the probe 12 and also provides the operator with some assurance that the circuit will operate when the liquid is out of contact with the probe 12. The circuit of FIG. 2 provides for a discernible indication when the liquid is at a level to contact the probe 12. The circuitry of FIG. 2 includes the circuitry of FIG. 1 and in addition the third circuit portion includes circuitry which is operatively connected to the one-shot multivibrator 28 and the latch circuit 22 plus the D.C. voltage supply 18 via the switch 20. The additional circuitry includes an indicating device 44, a driver circuit 46 for the indicating device 44 and an interface circuit 48 for connecting the driver circuit 46 to the output 34 of the multivibrator 28 and to the output 37 of the latch circuit 22. The driver circuit 46 serves to drive the indicating device 44 to provide a discernible indication when the signal at signal point 2 is one that is due to the presence of liquid at the probe 12 and has been stored in the latch 22 by operation of the switch 20 to its closed position. Operation of the driver circuit 46 is terminated when the one-shot multivibrator 28 is reset via the delay circuit 36. As in the case of the indicating device 42, the indicating device 44 can be a light source or can be a sound producing device. With this arrangement the delay circuit 36 not only serves to prevent the entry of another reading from the signal point 2 of the first circuit portion for a suitable time as in the case for FIG. 1, but also provides for a discernible indication for the time period provided by the delay circuit 36 in the event that the liquid level is such as to contact the probe 12. When the liquid level circuit of FIG. 2 is used for the detection of the oil level for an automobile engine, the operator of the automobile will thus be provided with a discernible indication for a short period of time after the engine has been started should the oil level be at an acceptable level, i.e., in contact with the probe 12 at the time the switch 20 is operated to its closed position.

Figure 3:
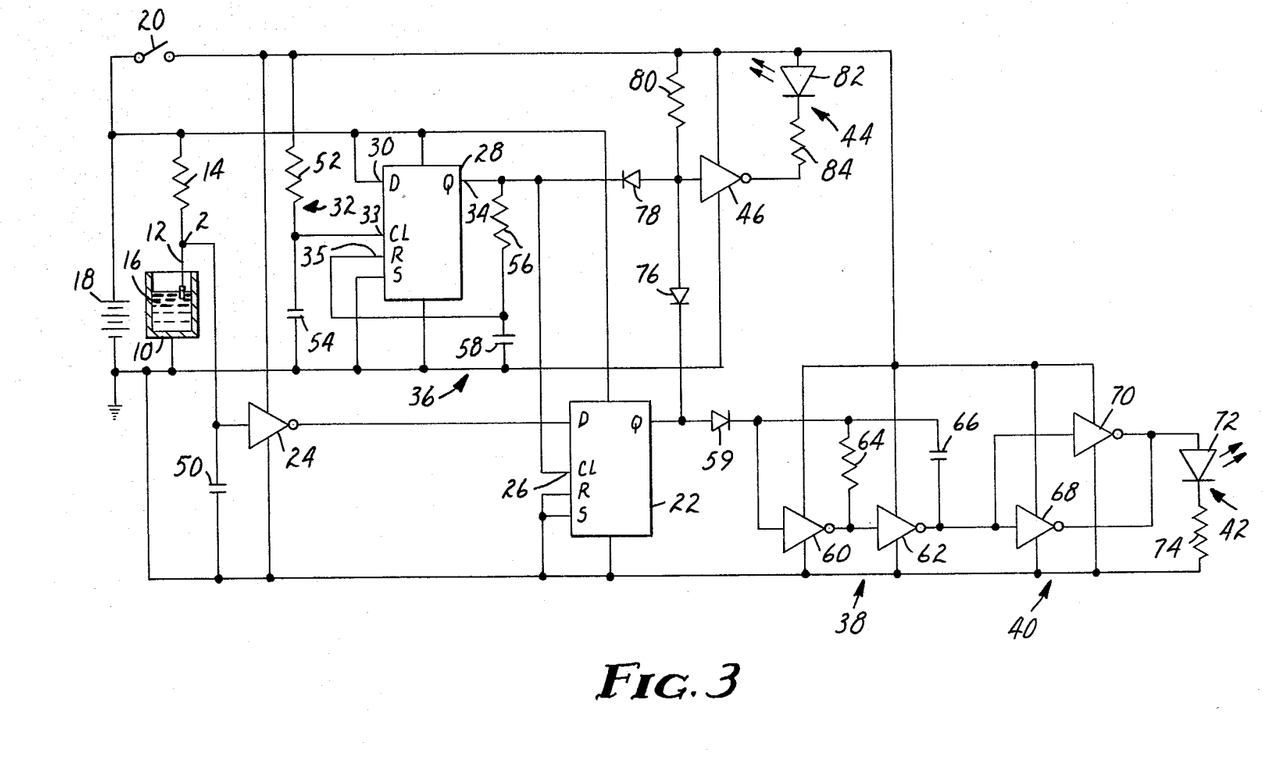
FIG. 3 is a schematic circuit showing circuit details for circuitry in accordance with FIG. 2.

Referring to FIG. 3 the circuit of FIG. 2 is shown using exemplary circuits for the circuit portions of FIG. 2 that appear only in block diagram form. A number of inverters are used in the circuitry of FIG. 3 since they are high impedance devices and are available wherein six are provided on a single substrate. Suitable inverters are available under the type designation CD 4049. One of the inverters is used as the high input impedance device 24. To avoid any problems that may be due to noise presented to the input of the inverter 24, a bypass capacitor 50 may be connected between the input to the inverter and ground. This bypass capacitor is not needed if a shielded cable is used in the construction of the probe 12 and its connection to the inverter 24. In either case, however, a time constant is presented by the circuit making it desirable to connect the resistor 14 directly to the D.C. voltage source 18. The delay circuit 32 can be provided by a resistor 52 connected in a series with a capacitor 54 with the common connection for the resistor and capacitor connected to the clock input for the one-shot multivibrator 28 that is formed using a "D" type flip-flop device. Such a device is available under the type designation CD 4013. The delay circuit 36 is provided by a resistor 56 connected in series with a capacitor 58 with the connection common to the resistor and capacitor connected to the reset input of the one-shot multivibrator 28. The D input for the multivibrator is connected to the positive side of the D.C. voltage supply 18. The operation of the multivibrator circuit 28 is such that a clock signal, a positive going signal, presented to the clock input causes the signal presented to the D input to be transferred to the Q output. Accordingly, upon closure of the switch 20, a clock signal will be presented by the delay circuit 32 to the clock input of the one-shot multivibrator 28 causing a logic high signal at the D input to be present at the Q output of the multivibrator. A reset signal presented to the reset input for the multivibrator from the delay 36 will cause the Q output to present a low logic signal. The latch circuit 22 can also be provided by a CD 4013 device (D-type flip-flop). The output of the inverter 24 is supplied to the D input of the latch circuit 22 and the clock input is connected to the Q output of the multivibrator circuit 28. The reset and set inputs for the latch circuit 22 are connected to ground. When a high logic signal is presented at the Q output of the multivibrator 28, the latch circuit 22 is clocked causing the signal present at the output of the inverter 24 to be transferred to the Q output of the latch circuit 22. Thus, if a high logic signal is presented at the output of the inverter 24 it will be transferred as a high signal to the Q output upon receipt of a clock signal by the latch circuit 22. Similarly, a low logic signal at the output of the inverter 24 will be transferred to the Q output of latch circuit 22 when a clock signal is received from the multivibrator 28. The oscillator 38 is provided by two series connected inverters 60 and 62 plus a resistor 64 and capacitor 66. The resistor 64 has one end connected to the connection that is common to the output of inverter 60 and the input of inverter 62 with its other end connected to the output of the inverter 62 via the capacitor 66. The connection common to resistor 64 and capacitor 66 is connected to the input of inverter 60. The oscillator includes a diode 59 for connecting the input of inverter 60 to the Q output of the latch circuit 22. The diode 59 is poled so the anode is connected to the latch circuit 22. Two inverters 68 and 70 are connected in parallel and form a circuit that is suitable for the driver circuit 40. Two inverters are used to provide the output necessary for operation of the indicating device 42. The input for the inverters 68 and 70 are connected to the output of inverter 62 of the oscillator 38. The output of the inverters 68 and 70 are connected to the indicating device 42 which is shown as a light emitting diode (LED) 72 and a resistor 74. The LED 72 and the resistor 74 are connected in series between the output of the inverters 68 and 70 and circuit ground. The circuitry described to this point together with the probe circuitry and switch 20 as shown in FIG. 3 is in accordance with the circuit of FIG. 1.

Operation of the circuit of FIG. 3 as described to this point is as follows:

Assuming the conductive probe 12 is in contact with the liquid 16, the signal input to the inverter 24 will be low. Upon closure of switch 20, power is supplied from the D.C. source 18 to the delay circuit 32, inverter 24, oscillator 38 and the driver circuit 40. With the input to the inverter 24 low, a high signal is presented to the D input of the latch circuit 22. A high signal is also presented to the D input of the multivibrator 28 since it is connected to the D.C. source 18. Upon completion of a short delay provided by the delay circuit 32 following closure of switch 20, the delay circuit 32 provides a clock signal to the multivibrator 28 causing the high signal at the D input to appear at the Q output which is also connected to the clock input of the latch circuit 22. Clocking of the latch circuit 22 by the high signal produced at the Q output of multivibrator 28 causes the Q output of the latch circuit 22 to go high. The high signal at the Q output of the latch circuit 22 is applied to the oscillator circuit 38 preventing the oscillator 38 from operating as an oscillator so that a low signal is presented at the output of inverters 68 and 70 so long as the Q output of the latch circuit 22 is high. With a low signal present at the Q output of inverters 68 and 70 of the drive circuit 40 the LED 72 remains off. Considering the other possible condition for the level of the liquid 16, i.e., the case where the probe 12 is not in contact with the liquid level 16, the signal input to the inverter 24 will be high, such condition causing a low signal to be presented to the D input of the latch circuit 22. When the latch circuit 22 is clocked by the multivibrator 28, the low signal at the D input to the latch circuit 22 is stored at the Q output of the latch circuit. With the Q output of the latch circuit presenting a low signal, the oscillator 38 will operate since the low signal presented at the Q output of the latch circuit 22 is isolated from the remainder of the oscillator circuit 38 by the coupling diode 59 of the oscillator circuit. When operating, the oscillator causes the output of the inverters 68 and 70 of the driver circuit 40 to alternate between a high and low level at a frequency determined by the RC time constant provided by the resistor 64 and the capacitor 66 of the oscillator. When the inverters 68 and 70 have a high signal presented at their output, the LED 72 conducts with the LED 72 turned off when the output at inverters 68 and 70 are low. Accordingly a flashing light is provided by the operation of the LED 72 to provide a discernible indication when the probe 12 is not in contact with the liquid 16.

The remainder of the circuit for FIG. 3 that has not been discussed involves the exemplary circuits for the indicating device 44, the driver 46 and the interface circuit 48 of the FIG. 2. The interface circuit includes the two diodes 76 and 78 plus the resistor 80. The resistor 80 and the diode 76 are connected in series between the switch 20 and the Q output of the latch circuit 22 with the cathode of the diode 76 connected to the latch circuit. The diode 78 is connected between the Q output of the multivibrator 28 and the connection common to resistor 80 and diode 76 with the cathode of the diode connected to the Q output of multivibrator 28. The driver 46 is provided by an inverter which has its input connected to the connection that is common to resistor 80 and diode 76. The indicating device 44 is provided by an LED 82 and a resistor 84 which are connected in series between the switch 20 and the output of the inverter 46. The circuitry that has just been described comes into play for providing a discernible signal when the probe 12 is in contact with the liquid 16 and switch 20 has been operated. As mentioned earlier closure of switch 20 leads to the clocking of multivibrator 28 to present a high signal at the Q output of the multivibrator with the latch circuit clocked by the Q output of the multivibrator 28 to store the high signal that is presented to the latch circuit 22 from the output of the inverter 24. As indicated previously, the presence of the high signal at the Q output of latch signal 22 is reflected as a continuous low signal at the output of inverter 68 and 70 of the driver circuit 40 so that the LED 72 is not conducting. A high signal, however, is presented to the input to the inverter 46 causing its output to be low allowing the LED 82 to conduct. The presence of a high signal to the input of inverter 46 is terminated when the multivibrator 28 is reset via the delay circuit 36 causing the Q output to present a low signal which is presented to the input of the inverter 46 via the diode 78. When the circuit of FIG. 3 is used to monitor the level of the engine oil for an automobile engine, the delay circuit 36 is designed to provide a delay of approximately 30 to 40 seconds.

Figure 4:
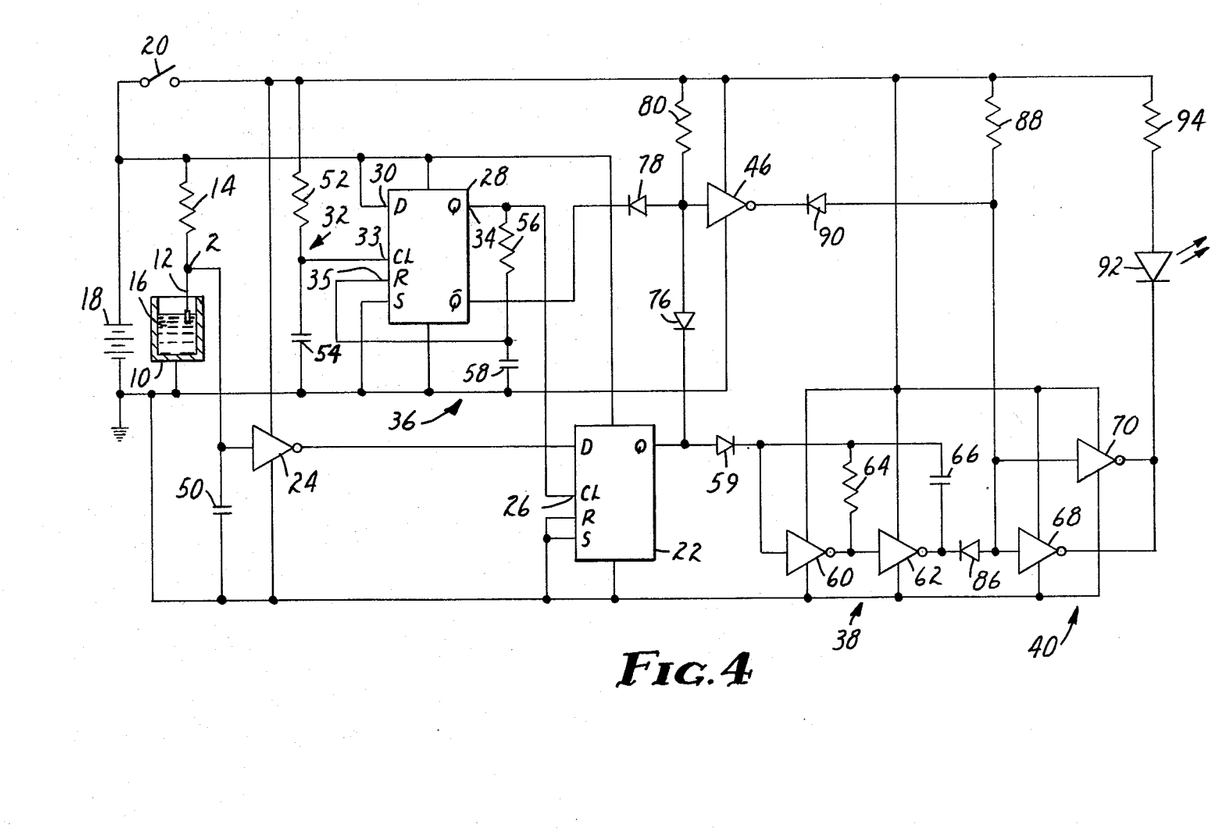
FIG. 4 is a schematic circuit showing circuit details generally in accordance with FIG. 1, but with modification made to cause the single indicating device to operate to provide a discernible indication when the liquid level sensed is in contact with the sensing probe.

FIG. 4 is a modification of the circuitry of FIG. 3 with respect to the portion that provides the discernible indication when the liquid level is in contact with the probe 12 and when it is out of contact with the probe 12. In the case of FIG. 4 a single indicating device is utilized and is connected so on/off operation of the indicating device is provided when switch 20 is initially closed and the probe 12 is out of contact with the liquid 16 with a steady or continuous operation of the indicating device provided for a period of time determined by the delay circuit 36 when switch 20 is initially closed and the probe 12 is in contact with the liquid 16. The interface circuitry 48 of FIG. 3 is also utilized in FIG. 4 except that the diode 78 is not connected to the Q output of the multivibrator 28, but is connected to the $\overline{Q}$ or inverted output of the multivibrator 28. The oscillator 38 remains the same as for FIG. 3 as does the driver circuit 40. A diode 86 is added between the output of the inverter 62 of the oscillator 38 and the driver inverter 68 with the cathode of the diode 86 connected to the output of the inverter 62. The input for the driver inverters 68 and 70 are also connected to the switch 20 via a resistor 88 which has its end which is connected to the input for driver circuit 40 connected to the output of the inverter 46 via a diode 90 which has its cathode connected to the output of the inverter 46. The indicating device for the circuit of FIG. 4 includes a diode 92 and a resistor 94 which are connected in series between the switch 20 and the output of the inverters 68 and 70.

With this arrangement, the operation of FIG. 4 is such that the low signal presented at the probe 12 when it is in contact with the liquid 16 is stored as a high signal at the Q output of the latch circuit 22 in the same manner as has been described with respect to FIG. 3. While this causes the output of the inverter 62 for the oscillator 38 to present a high signal, this high signal is isolated from the drivers circuit 40 by the diode 86. In addition, the oscillator 38 is not allowed to operate as an oscillator due to the presence of the high signal at the Q output of latch 22. When the multivibrator 28 is clocked via the delay 32 following operation of switch 20, a low signal caused to be presented at the $\overline{Q}$ or inverted output of the multivibrator 28 causing the input to the inverter 46 to be low and its output high. The input to the inverters 68 and 70 of the driver circuit 40 will then be high causing their outputs to be low which in turn causes the LED 92 to conduct to provide a discernible signal in the form of a continuous light. When the delay circuit 36 subsequently operates to reset the multivibrator 28, the $\overline{Q}$ output of the multivibrator 28 presents a high signal. Since the Q output of the latch 22 is also high, the input to the inverter 46 is high and its output low to provide a current path from the resistor 88 via the diode 90. This causes a low input signal to the inverters 68 and 70 of the driver circuit 40 causing the output of such inverters to go high turning off the LED 92.

Rather than have the LED 92 turned off by the multivibrator 28 when it is reset subsequent to the LED 92 being turned on due to the storage of a low signal present at the probe 12 when the switch 20 is closed, it may be desirable to have the LED 92 remain on until the switch 20 is opened. This type of operation can be obtained by the circuitry of FIG. 4 but with the diode 78 removed from the circuitry.

When the liquid 16 is at a level so the probe 12 is not in contact with the liquid, a high signal is presented to the inverter 24 which appears as a low signal at the D input to the latch circuit 22 with such low signal being stored at the Q output of the latch signal 22 upon receipt of a clock signal from the multivibrator 28 that is produced following the operation of the switch 20. The presence of a low signal at the Q output of latch 22 allows the oscillator 38 to function as an oscillator. The low signal present at the output Q of the latch 22 is coupled to the input of inverter 46 via diode 76. This causes the output of inverter 46 to be high. This output is prevented from affecting driver circuit 40 by the blocking action of diode 90. The input to the inverters 68 and 70 of the drivers circuit 40 change from high to low in accordance with the oscillations of the oscillator 38 causing the LED 92 to be turned on and off in accordance with the frequency of the oscillator 38. Resetting of the multivibrator 28 by the delay circuit 36 does not in any way influence the operation of the LED 92 since the Q output of the latch 22 is low. The on/off operation of the LED 92 continues until the switch 20 is opened.

In its broadest aspect, the foregoing circuitry described in connection with FIGS. 1-4, provides liquid level sensing arrangements wherein a first measure provides a first signal when a conductive probe is in contact with the liquid being monitored with a second signal provided when the liquid does not contact the conductive probe. A switch having a first and second position is operatively connected to a second means. When the switch is moved to its second position power is supplied to the second means causing the second means to store a signal dependent upon whether the first or second signal is present. A third means is provided which provides a first discernible signal upon storage of a signal when the second signal is present. The discernible signal remains until the switch is returned to its first position. Circuitry was described which can be used, if desired, for providing a second discernible signal that is different from the first discernible signal upon storage of a signal when the first signal is presented. The third means can be arranged so second discernible signal is presented for only a short time period or is presented until the switch is moved to its first position. Such circuitry it was pointed out is useful for monitoring the engine oil level for an automotive engine particularly in view of other features that are provided such as the prevention of multiple inputs following storage of the signal initially presented by the first means when the switch is operated.

It will be understood by those skilled in the art that various changes in form and detail may be made to the circuitry disclosed without departing from the spirit and scope of the invention.

What is claimed is:

1. Liquid level sensing circuitry including
first means adapted for connection to an electrical source of power for providing continuous energization of said first means, said first means including a conductive probe for providing a first signal when the liquid level sensed is in contact with said conductive probe and a second signal when the liquid level sensed is not in contact with said conductive probe;
second means operatively connected to said first means and including a switch having a first and second position, said second means storing said first and second signals in response to operation of said switch to said second position;
and third means operatively connected to said second means for providing a discernible indication in response to the storing of said second signal by said second means, said indication terminating when said switch is operated to said first position.

2. The liquid level sensing circuitry of claim 1 wherein said third means is also operatively connected to said second means for providing a temporary discernible indication in response to the storing of said first signal by said second means.

3. The liquid level sensing circuitry of claim 2 wherein said third means includes a single discernible indication producing device for providing said first-mentioned discernible indication and said temporary discernible indication.

4. The liquid level sensing circuitry of claim 2 wherein said third means includes a first discernible indication producing device for providing said first-mentioned discernible indication and a second discernible indication-producing device for producing said temporary discernible indication.

5. The liquid level sensing circuitry of claim 1 wherein said second means includes a clocking circuit portion operatively connected to said switch for providing a clocking signal in response to operation of said switch to said second position and a latch circuit portion operatively connected to said clocking circuit portion for storing said first and second signals in response to said clocking signal.

6. The liquid level sensing circuit of claim 3 wherein said clocking circuit portion includes means for providing delayed resetting of said clocking circuit portion whereby operation of said switch from said second position to said first position and then to said second position prior to resetting of said clocking circuit portion is ineffective to cause said clocking circuit portion to produce a clocking signal.

7. The liquid sensing circuitry of claim 3 wherein said third means is also operatively connected to said clocking circuit portion and said latch circuit portion for providing a discernible indication initiated in response to the storing of said first signal by said second means and terminated in response to resetting of said clocking circuit portion.

8. The liquid level sensing circuitry of claim 1 wherein said third means is also operatively connected to said second means for providing a discernible indication in response to the storing of said first signal by said second means.

9. The liquid level sensing circuitry of claim 8 wherein said third means includes a single discernible indication producing device for providing both of said discernible indications.

10. Liquid level sensing circuitry including:
first means including a conductive probe for providing a first signal when the liquid level sensed is in contact with said conductive probe and a second signal when the liquid level sensed is not in contact with said conductive probe;
second means operatively connected to said first means and including a switch having a first and second position, a clocking circuit portion operatively connected to said switch for providing a single clocking signal in response to operation of said switch to said second position and a latch circuit portion operatively connected to said clocking circuit portion for storing said first and second signals in response to said clocking signal;
and third means operatively connected to said second means for providing a discernible indication in response to the storing of said second signal by said second means, said indication terminating when said switch is operated to said first position.

11. The liquid level sensing circuit of claim 10 wherein said clocking circuit portion includes means for providing delayed resetting of said clocking circuit portion whereby operation of said switch from said second position to said first position and then to said second position prior to resetting of said clocking circuit portion is ineffective to cause said clocking circuit portion to produce a clocking signal.

12. The liquid sensing circuitry of claim 10 wherein said third means is also operatively connected to said clocking circuit portion and said latch circuit portion for providing a discernible indication initiated in response to the storing of said first signal by said second means and terminated in response to resetting of said clocking circuit portion.

13. The liquid level sensing circuitry of claim 10 wherein said third means is also operatively connected to said second means for providing a temporary discernible indication in response to the storing of said first signal by said second means.

14. The liquid level sensing circuitry of claim 13 wherein said third means includes a single discernible indication producing device for providing said first-mentioned discernible indication and said temporary discernible indication.

15. The liquid level sensing circuitry of claim 13 wherein said third means includes a first discernible indication producing device for providing said first-mentioned discernible indication and a second discernible indication-producing device for producing said temporary discernible indication.

16. The liquid level sensing circuitry of claim 10 wherein said third means is also operatively connected to said second means for providing a discernible indication in response to the storing of said first signal by said second means.

17. The liquid level sensing circuitry of claim 16 wherein said third means includes a single discernible indication producing device for providing both of said discernible indications.

* * * * *